Aug. 7, 1956  N. A. MacLEOD  2,757,962
WATERING SYSTEM, INCLUDING HOSE AND SUPPORT
Filed April 27, 1954  3 Sheets-Sheet 1
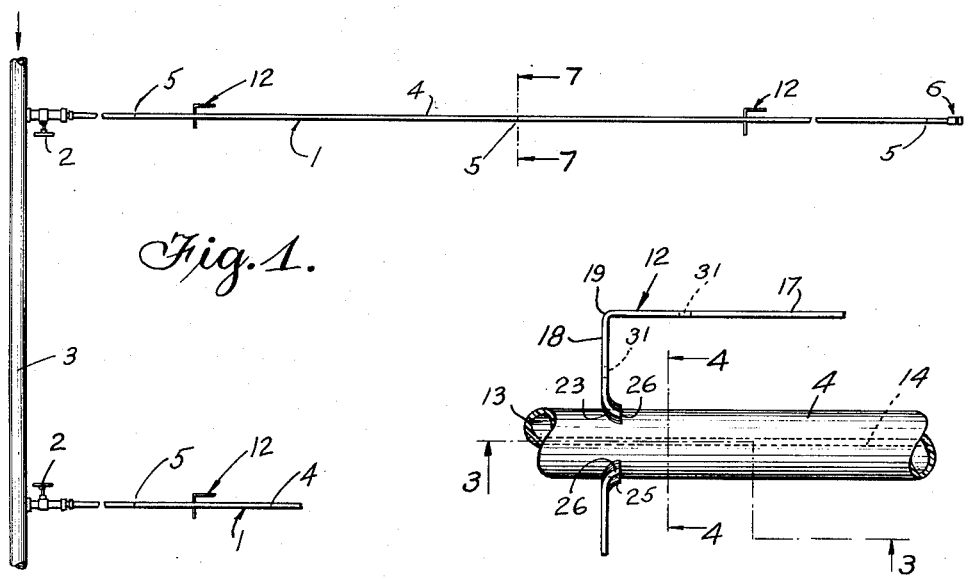
Fig. 1.
Fig. 2.
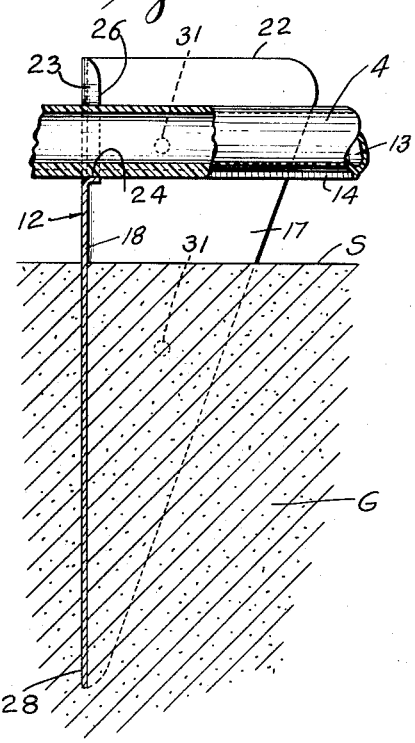
Fig. 3.
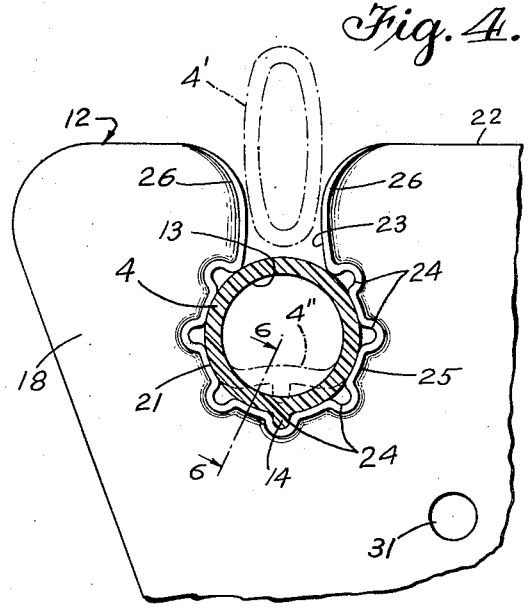
Fig. 4.
INVENTOR.
Norman A. MacLeod.
BY
ATTORNEYS.

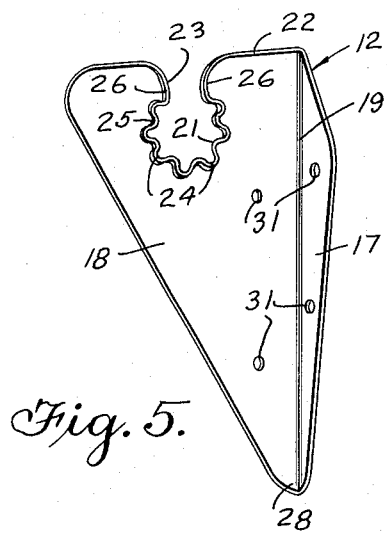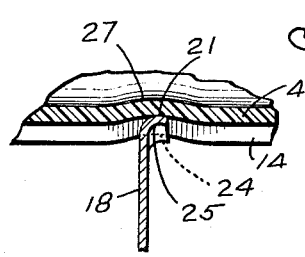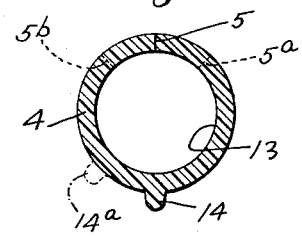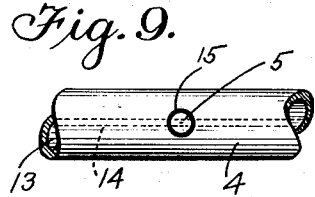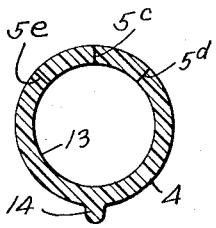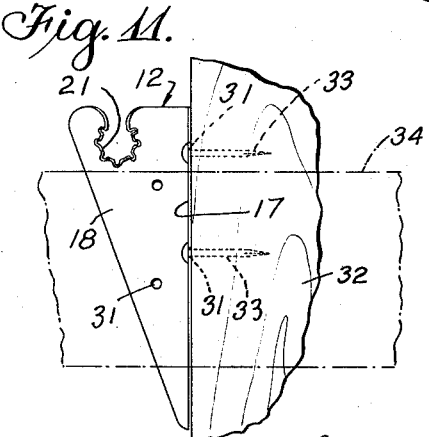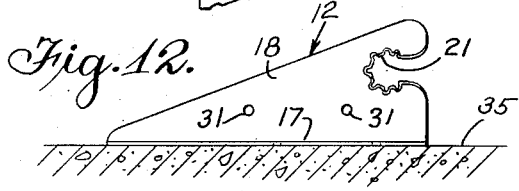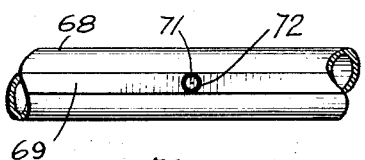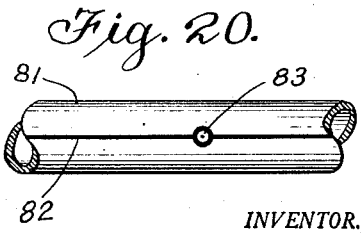

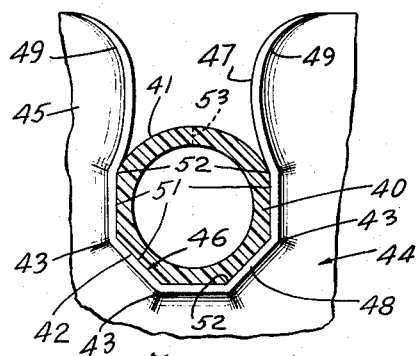
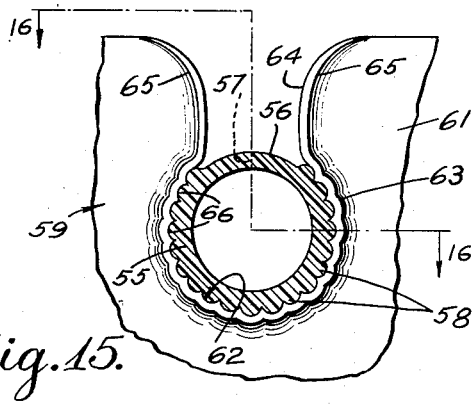
Fig. 14.  Fig. 15.
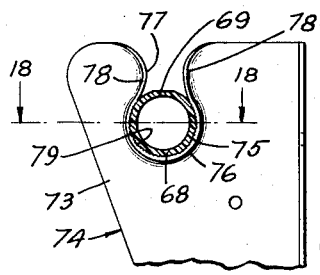
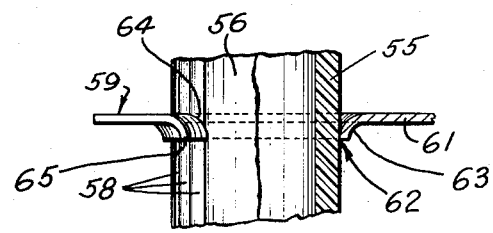
Fig. 17.  Fig. 16.
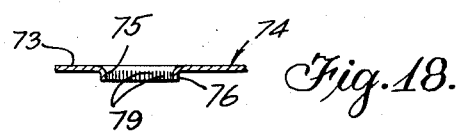
Fig. 18.
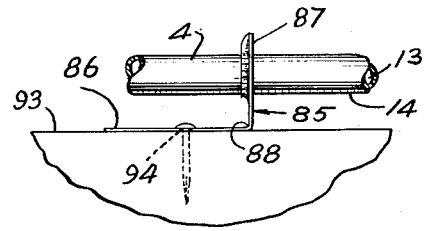
Fig. 23.
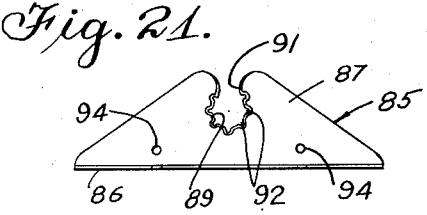
Fig. 21.
Fig. 22.
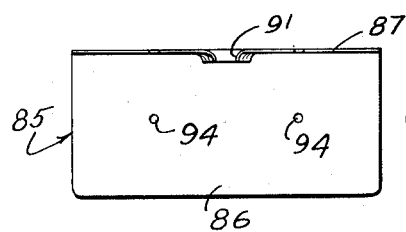
INVENTOR.
Norman A. MacLeod.
BY
ATTORNEYS.

United States Patent Office 2,757,962
Patented Aug. 7, 1956

2,757,962

WATERING SYSTEM, INCLUDING HOSE AND SUPPORT

Norman A. MacLeod, Altadena, Calif.

Application April 27, 1954, Serial No. 425,913

7 Claims. (Cl. 299—72)

This invention relates to watering systems for use in irrigation, humidification, or other purposes, and more particularly to a watering system adapted to deliver water in the form of finely divided sprays distributed over an area.

An important object of the invention is to provide simple and inexpensive means for delivering water at a relatively low rate per unit of time and per unit of area.

In normal systems for irrigating trees or other plants, it is common practice to deliver water at relatively large rates for relatively short portions of the period of growth of the plants, in order to supply to the ground sufficient moisture to provide for the growing requirements of the plants. Such methods of irrigation require large and relatively expensive delivery systems, necessitate the use of delivery rates very much higher than the rate at which the plants absorb water, and introduce other serious problems such as soil erosion and the difficulty of obtaining uniform delivery of water to different parts of an area.

A particular object of this invention is to provide an irrigating or watering system that is adapted to deliver water at a relatively low rate corresponding much more closely with the water requirements or absorption rates of growing plants, and preferably below the rate at which water will penetrate the soil. A further object is to accomplish this result with a system having a low cost of installation as well as low cost of operation and maintenance.

In accomplishing these objects in accordance with this invention, I use delivery means of relatively small capacity and low cost, requiring small amounts of material, and adapted to deliver water at rates which approach the rate of consumption of water by the plants. The delivery means comprises small diameter tubing discharging water in small jets or sprays spaced at suitable intervals over a relatively great length. The tubing is formed of flexible resilient non-corroding material and is provided at suitable intervals with perforations or orifices so small that only minimal quantities of water are discharged therethrough in the form of finely divided sprays, the perforations being so spaced that substantially uniform distribution of water is achieved along the entire length of the tubing or along any selected portions thereof which are provided with perforations.

However, the use of small diameter flexible tubing of the usual circular cross sectional configuration presents certain problems due to the difficulty of properly controlling the position of the tubing and the direction of the water sprays issuing from the small perforations, as determined by the orientation of the perforations relative to the axis of the tubing. These difficulties result from the great flexibility of the tubing due to its small diameter and relatively small wall thickness, and also from the tendency of the tubing to twist about its axis due to its radial symmetry. Further difficulty in properly positioning the water sprays and controlling the direction thereof results from the fact that the perforations in the tubing are so small as to be almost undetectable visually when no water is being delivered and, even when water is supplied it is difficult to detect accurately the position and direction of the water jets due to the small size thereof and the very small size of the individual water particles.

It will be readily understood that it is of great importance to control the direction of the sprays in order to secure the proper delivery of water to desired areas relative to the position of the tubing, for example at given positions at one or both sides of the tubing. It is therefore a further object of the invention to provide means for controlling the position of the tubing and the direction of the water sprays issuing therefrom.

For this purpose I provide, in combination with a length of small diameter flexible tubing provided with spaced small perforations, a plurality of holders disposed at suitable intervals along the length of the tubing, which engage the tubing to position it and control its orientation relative to its axis and thereby control the orientation of the perforations. In the preferred embodiments of the invention, the external configuration of the tubing is such as to provide radial asymmetry at one or more positions around its circumference, in predetermined relation to the orientation or angular position of the small perforations, and the holders are formed to engage the radially asymmetric element or elements of the tubing so as to maintain a desired orientation of the perforations and constrain the tubing against rotation about its axis.

Another object of the invention is to provide for readily detecting the location of the small perforations in the tubing, both with respect to their angular position or orientation about the axis of the tubing and their positions along the length thereof. In the preferred embodiments mentioned above, the radial asymmetry of the tubing furnishes a means of readily detecting the orientation of the perforations, and a suitable mark may be provided adjacent each perforation for detecting its position along the length of the tubing.

A further object of the invention is to provide a simple, inexpensive and effective form of holder for use in positioning the perforated small diameter flexible tubing and controlling the direction of the water sprays in a system such as described above. In accordance with my invention, such a holder is provided with a bearing portion of extended surface area for engagement with the ground or other fixed support, with an opening adapted to receive the tubing, and with means adjacent the opening for engaging the tubing to position it and constrain it against rotation about its axis.

Further objects and advantages of my invention will be brought out hereinafter or will be apparent from the following description.

The accompanying drawings illustrate a watering system in accordance with the present invention, and several forms of small diameter flexible tubing and holders for use therein, as follows:

Fig. 1 is a broken plan view showing typical portions of a preferred form of watering system;

Fig. 2 is a plan view showing a preferred form of one of the tubing holders shown in Fig. 1 and the adjacent portion of the tubing engaged thereby, on a somewhat enlarged scale;

Fig. 3 is a vertical section on line 3—3 in Fig. 2, showing the holder inserted in the ground;

Fig. 4 is a vertical section on line 4—4 in Fig. 2, on a larger scale;

Fig. 5 is a perspective view of a tubing holder of the type shown in Figs. 2–4;

Fig. 6 is a fragmentary sectional view on line 6—6 in Fig. 4;

Fig. 7 is a transverse section on line 7—7 in Fig. 1, on the same scale as Fig. 4, showing a preferred configuration of the tubing and one of the perforations therein;

Fig. 8 is a fragmentary transverse section of the wall of the tubing shown in Fig. 7, on a still larger scale, with the tubing distended by internal pressure of water;

Fig. 9 is a plan view of a portion of the tubing adjacent one of the perforations;

Fig. 10 is a sectional view showing means for closing the end of the tubing;

Fig. 11 is a side elevation showing one of the holders secured to a fixed support;

Fig. 12 is a side elevation showing one of the holders in another position;

Fig. 13 is a transverse section similar to Fig. 7 showing a modified arrangement of perforations in the tubing;

Figs. 14 and 15 are fragmentary transverse sections showing modified configurations of the tubing and holder;

Fig. 16 is a sectional view on line 16—16 in Fig. 15;

Fig. 17 is a partial side elevation of another modified form of holder, with a modified form of tubing shown in transverse section;

Fig. 18 is a fragmentary sectional view on line 18—18 in Fig. 17, with the tubing omitted;

Fig. 19 is a plan view of a portion of the tubing shown in Fig. 17, adjacent one of the perforations therein;

Fig. 20 is a partial plan view similar to Fig. 19, showing another form of tubing;

Fig. 21 is a side elevation showing another form of holder;

Fig. 22 is a plan view of the holder shown in Fig. 21; and

Fig. 23 is an end view thereof, showing a portion of the tubing in engagement therewith.

The watering system illustrated in Fig. 1 comprises any desired number of delivery lines or conduits 1 connected through valves 2 to a pipe or other conduit 3 for supplying water thereto at suitable pressure. Each of the delivery lines or conduits 1 comprise a length of tubing 4 provided with a plurality of very small perforations or orifices 5 spaced at suitable intervals along the length thereof.

The tubing 4 is formed of flexible resilient non-corroding material such as a flexible resilient resin or plastic, or rubber. Plastic material such as a vinyl resin, for example, polyvinyl chloride copolymer, has been found to be well suited for this purpose.

The tubing 4 is of small diameter and is sufficiently flexible or yielding, and of sufficiently small wall thickness, to undergo appreciable distension under internal pressure of water supplied thereto. For example, the internal diameter of the tubing may be about 3/16 inch, and the wall thickness thereof may be about 1/32 inch or less. From pratical considerations of manufacture and service, the tubing is preferably between about 1/8 and 1/4 inch inside diameter, and between .015 and .035 inch wall thickness.

The perforations 5 may be provided at any suitable intervals along the length of the tubing, for example, at intervals of about 1 to 3 feet or more. They are very small so as to discharge water at a very low rate under normal water pressures such as about 10 to 70 p. s. i. For best results, the perforations should not exceed .005 inch diameter when the tubing wall is unstressed. They are preferably formed by piercing the resilient tubing wall with a needle or other sharp pointed instrument without removing any of the material from the wall so that, when the piercing instrument is withdrawn, the perforation or orifice 5 is essentially closed when the tubing is not under pressure and the wall is unstressed. Upon application of internal water pressure, the tubing distends sufficiently to open a very small passage through the perforation, as indicated at 5' in Fig. 8 for discharge of water in a very fine stream but at sufficient velocity to project the water several feet from the tubing, for example, from about 2 to 10 feet or more, depending upon the pressure and the diameter of the orifice when the tubing is distended. Under these conditions, the issuing water stream breaks up almost immediately into very fine particles or droplets, forming a very finely divided spray resembling a fine mist, which spreads and falls over a considerable area around the position of the perforation so as to deliver the water uniformly over the area adjacent the tubing.

For most purposes, the spaced perforations 5 are preferably formed in alinement with each other along the length of the tubing, that is, the perforations are disposed at the same angular positions or orientation about the axis of the tubing when the latter is free from external stresses tending to twist it about its axis.

The tubing in each delivery line 1 may be of any desired length up to the capacity of the tube to supply water through all the perforations without undue diminution of pressure. Due to the small amount of water delivery through each perforation, I have found that lengths of tubing up to 300 feet or more may be used without excessive variation in delivery rate through successive perforations along the length of tubing, from the supply end to the opposite end, provided the pressure at the supply end of the line of tubing is not excessively high so as to cause an excessively high rate of delivery of water through the perforations adjacent the supply end. In some cases, it may be necessary to restrict the flow of water into the tubing, as by adjustment of valve 2 or by providing a fixed restriction at the supply end of the line, so as to limit the pressure in the tubing to a suitable value, for example, about 50 p. s. i. or less. In using open end tubing such as formed by ordinary manufacturing methods, it is necessary to provide some means for closing the tubing at the end of each line 1 opposite the point of connection to the supply line 3, as indicated at 6 in Fig. 1.

A suitable form of closure means 6 for this purpose, illustrated in Fig. 10, comprises an internally threaded nut 7 fitting around the end of the tubing, a thimble-shaped closure member 8 of slightly greater diameter than the normal internal diameter of the tubing 4 inserted within the end of the tubing, and an externally threaded plug 9 screwed into the nut and bearing against the outer end of the closure member so as to clamp the tubing between the nut and the closure member and hold it in tight sealing engagement with the latter.

A plurality of tubing holders such as shown at 12 are provided at suitable intervals along the length of each delivery line 1, each tubing holder being in supporting engagement with the ground or other fixed support, and engaging the tubing at a position between adjacent perforations to hold it in the desired position relative to the surrounding area and constrain it against rotation about its axis so as to control the orientation of the perforations and the direction of the sprays issuing therefrom.

A preferred form of tubing 4 is shown in Figs. 2 through 4 and 6 through 9. It is generally cylindical in shape, having a cylindrical internal bore or passage 13, but is provided at its outer periphery with at least one radial asymmetry in the form of a small projecting ridge or bead 14 extending longitudinally of the tubing. The ridge 14 is located at a certain orientation or angular position relative to the alined perforations 5, and thus makes it possible to readily detect the orientation of the perforations. A preferred location of the ridge 14 is at the side of the tubing opposite perforations 5, as best shown in Figs. 7 and 9. Since the orientation of the ridge is easily detected by observation, the perforations are known to be oriented at 180° therefrom. Thus, for example when the tubing is positioned with the ridge 14 at the bottom thereof, as shown in the drawings, the perforations 5 are located at the top side of the tubing and the sprays will be directed vertically upward. The ridge 14 also cooperates with positioning means on each of the holders 12 to hold the tubing in a desired orientation, as described hereinafter. When using end closure means 6 of the type shown in Fig. 10, the ridge 14 may be easily cut away for a short distance adjacent the end of the tubing to permit insertion of the tubing through the central opening in nut 7.

A suitable mark is also preferably provided on the outside surface of the tubing adjacent each of the perforations 5 in order to afford ready detection of their location along the length of the tubing. For example, the positions of the perforations may be indicated by a small circle painted on the tubing about each perforation as shown at 15 in Fig. 9, in a color contrasting with that of the tubing.

A preferred form of tubing holder 12 is illustrated in Figs. 2 through 6. It comprises a unitary member of small thickness having a flat wall 17 of extended surface area adapted to engage a fixed support, and another wall 18 integrally connected to the wall 17 and extending at a wide angle, preferably about 90°, with respect to the wall 17 to form a corner 19 at the meeting edges of said walls. The second wall 18 is provided with an opening 21 formed to receive and engage the tubing 4, and preferably also has a flat surface of extended area so as to bear against a fixed support in certain methods of use as described hereinafter.

The opening 21 is provided adjacent the upper edge 22 of wall 18 when the holder is in its normal upright position as shown in Figs. 3 through 5, but is located a short distance below the upper edge, and the wall 18 is formed to provide a restricted slot extending from said opening to said upper edge. The slot 23 is of sufficient width to permit the tubing to pass therethrough when compressed laterally, as indicated in dot-dash lines at 4' in Fig. 4, so that the tubing may be inserted into and removed from the opening 21, but is of somewhat less width than the opening so as to retain the tubing in the opening until it is forcibly deformed for removal through the slot.

The opening 21 is generally circular in shape to conform to the generally circular external configuration of the tubing, but is provided with a plurality of angularly spaced radial asymmetries in the form of notches or recesses 24 extending outwardly from the circumference of the opening as defined by the arcuate portions between adjacent notches. Each of the notches 24 is of such shape as to receive and engage the ridge 14 on the tubing and thereby constrain the tubing against rotation. The tubing is adapted to be inserted into the opening 21 in any one of a plurality of orientations such as to bring the ridge 14 into engagement with any one of the notches 24, thereby determining and controlling the orientation of the perforations in the tubing. For example, when the ridge 14 is engaged in the central notch at the bottom of the opening 21, as shown in Figs. 3 and 4, the tubing is oriented with the perforations 5 directed vertically upward as shown in Fig. 7. If the tubing is turned clockwise in Figs. 4 and 7 to bring the ridge to the position shown in dotted lines at 14a in Fig. 7 so as to engage with the next adjacent notch in Fig. 4, the perforations will be disposed at a corresponding angular direction or orientation as shown in dotted lines at 5a in Fig. 7. It will be evident that the tubing may thus be adjusted angularly about its axis relative to the holder 12 and may be held in a desired one of a number of different angular positions so as to obtain a desired orientation of the perforations, such as vertically upward or at different angular directions either side of the vertical. The ridge 14 may be easily removed from the notch 24 in which it is engaged by forcibly deforming the tube to a position such as shown in dot-dash lines at 4'' in Fig. 4, so as to permit the tubing to be rotated to shift it to a different position.

The wall 18 is preferably formed to provide a rounded flange 25 around the opening 21 and a rounded flange 26 at each side of the restricted slot 23 in order to avoid cutting or undue wear of the tubing by engagement with a thin edge of the wall. The minimum diameter of the opening 21 as determined by the edge portion of the flange 25 between the notches 24 is preferably such as to engage snugly the outside of the tubing 4, and may be slightly less than or equal to the normal outside diameter of the tubing so as to constrict the tubing somewhat at the positions of engagement therewith, as shown at 27 in Fig. 6, either when the tubing is in its normal shape or when it is distended by internal water pressure.

The walls 17 and 18 of the holder 12 are preferably triangular in shape, the free edges thereof being inclined downwardly and inwardly toward the corner 19 to provide a downwardly tapering and somewhat pointed lower end 28, as best shown in Fig. 5, so that the holder may be easily inserted into the ground to a sufficient depth to support the holder firmly and prevent inadvertent angular movement thereof. In Fig. 3 the holder is shown inserted in the ground G to a substantial depth below the ground surface S, with the tubing 4 held firmly in position a short distance above the ground surface. It will be evident that the two walls 17 and 18 provide extended bearing surfaces at approximately right angles to each other, thus providing firm bearing against the ground to prevent movement of the holder in the ground by lateral force applied in any direction. It will also be apparent that the holder 12 may be inserted in the ground either in the vertical position shown in Figs. 3–5, or at any desired angular position about the axis of the tubing 4 so as to control the orientation of the perforations 5 without changing the orientation of the tubing relative to the holder.

The holder 12 is preferably also provided with one or more preformed small holes for receiving nails, screws, wire or other fastening means, for use in mounting the holder on a suitable support in case it is desired to place the tubing at some distance above the ground. For this purpose, I have shown a plurality of such small holes 31 at spaced positions in each of the walls 17 and 18.

Fig. 11 shows the holder 12 mounted on a support 32 such as a post or other wooden member, with the wall 17 bearing against the support 32 and secured thereto by small nails 33 driven through the holes 31 in said wall. Alternatively, the wall 18 may be similarly secured in bearing engagement with a wood support such as indicated in dot-dash lines at 34. These methods of mounting the holder are especially useful in lath houses or other enclosures, for supporting the tubing at any desired elevation to supply sprays of water to plants.

Fig. 12 illustrates another method of use of the tubing holder 12, in which it is laid on its side on a solid support 35 such as hard ground or a brick or concrete wall. In this case, the wall 17 is disposed horizontally with its extended lower surface in bearing engagement with the support 35 so as to prevent tilting of the holder. The wall 18 extends vertically upward in position to receive and support the tubing in the opening 21 and control the orientation of the perforations 5 in the same manner as described above.

Instead of providing only a single row of alined perforations all oriented in a single direction, I may provide perforations at different orientations. For example, as illustrated in Fig. 7, I may provide one perforation 5, diametrically opposite the ridge 14, the next at 45° clockwise therefrom as indicated in dotted lines at 5a, and the next at 45° counter-clockwise from the first perforation as indicated in dotted lines at 5b, and repeat this same sequence along the length of the tubing, with each perforation spaced a suitable distance, say from one to three feet, from the next. Another possible alternative is to provide a plurality of perforations at each position along the length of the tubing. For example, Fig. 13 shows a group of three perforations 5c, 5d and 5e spaced at 45° intervals around the circumference of the tubing 4 at one longitudinal position, with the central perforation diametrically opposite the ridge 14. This same grouping of perforations may be repeated at intervals or, say, one to three feet along the length of the tubing, so as to provide three separate diverging sprays at each longitudinal position and thus cover a wider area laterally of the tubing.

Figs. 14–16 illustrate certain modifications in the form and arrangement of radial asymmetries on the external surface of the tubing and on the tubing-engaging opening of the holder.

In Fig. 14 the external surface of the tubing 40 is provided with a smooth arcuate portion 41 and a plurality of flat portions 42 defining a plurality of angularly spaced radial asymmetries in the form of outwardly projecting angular shoulders 43 extending longitudinally of the tubing. The tubing holder is shown partially at 44 and comprises a wall 45 similar to the wall 18 of tubing holder 12, provided with an opening 46 formed to receive and engage the tubing 41 and a restricted slot 47 similar to the slot 23 described above. The wall 45 is formed to provide a curved flange 48 around the opening 46, having a curvature transverse to the wall 45 similar to that of flange 25 as shown in Fig. 6, and a curved flange 49 at each side of slot similar to the flanges 26 in Figs. 2–4. The inner edge of flange 48 is formed to provide at least one radial asymmetry adapted to engage a selected one of the angular shoulders 43 on the tubing 40. It is preferably provided, as shown, with a plurality of flat portions 51 formed to correspond to the flat portions 42 on the tubing, so as to provide a plurality of circumferentially spaced angular notches 52 adapted to engage different ones of the angular shoulders 43 and thus retain the tubing in any one of a plurality of differently oriented positions and control the orientation of the perforations in tubing 40. These perforations are preferably located centrally of the arcuate portion 41 of the tubing as shown at 53, so that the orientation of the perforations can readily be detected due to their known angular position midway between the lateral edges of this arcuate portion.

In Figs. 15 and 16, the external surface of tubing 55 is again provided with a smooth arcuate portion 56 and the perforations 57 are located centrally of this portion. The remaining portion of the external circumference of the tubing is formed to provide a plurality of closely spaced radial asymmetries in the form of outwardly projecting ridges 58 extending longitudinally of the tubing. The tubing holder is shown partially at 59 and comprises a wall 61 similar to the wall 18 of tubing holder 12, provided with an opening 62 having a curved flange 63 formed to receive and engage the tubing, and a restricted slot 64 having curved flanges 65. The inner edge of flange 63 is formed to provide at least one radial asymmetry adapted to engage a selected one of the ridges 58 on the tubing. It is preferably formed, as shown, to provide a plurality of notches or indentations 66 whose angular spacing and shape correspond to the ridges 58, adapted to engage said ridges and hold the tubing in any desired orientation, thereby controlling the orientation of the perforations 57.

In some cases I may dispense with the provision of a radial asymmetry at the external surface of the tubing for engagement by the tubing holder to constrain the tubing against rotation, and rely upon frictional engagement with the tubing for this purpose, as illustrated in Figs. 17–20. Figs. 17 and 19 show a tubing 68 having the major portion of its external surface of cylindrical shape, free from projections or other radial asymmetries. To provide for detecting the orientation of the perforations, the tubing may be provided at one circumferential position with a flat external surface portion 69 of small circumferential extent, extending longitudinally of the tubing, and the perforations may be located centrally of this flat portion as shown at 71. The location of each perforation lengthwise of the tubing may be indicated, as before, by a circle or other suitable mark 72 on the outside of the tubing adjacent each perforation. The wall 73 of tubing holder 74 is provided with a circular opening 75 surrounded by a curved flange 76 whose inner edge is formed to engage snugly the tubing 68, and with a restricted slot 77 for insertion and removal of the tubing, a curved flange 78 being provided at each side of said slot.

In order to provide sufficient frictional engagement to hold the tubing in a desired position of orientation in the opening 75, the diameter of the inner edge of flange 76 is preferably slightly less than that of the tubing 68 when the latter is unstressed, so that the tubing will be compressed somewhat when inserted in the opening, and the inner face of the flange may be milled or otherwise roughened as indicated at 79 to provide a better grip on the tubing.

Fig. 20 shows a tubing 81 whose entire external surface is cylindrical. This form of tubing may be used in place of tubing 68, with a holder 74 as shown in Fig. 17, and is shown as having a line or narrow band 82 painted thereon and extending longitudinally of the tubing at the circumferential position of the perforations 83, to provide means for detecting the orientation of the perforations.

Except for the modifications described above, the tubings 40, 55, 68 and 81 and tubing holders 44, 59 and 74 shown in Figs. 14–21 may be substantially the same as the above described tubing 4 and holder 12.

Another modified form of tubing holder is shown at 85 in Figs. 21–23. It comprises a unitary member of small thickness having a wall 86 of extended surface area adapted to engage a fixed support, and another wall 87 integrally connected to the wall 86 and extending at approximately right angles thereto. The second wall 87 preferably also has a flat surface of extended area so as to bear against a fixed support in certain methods of use.

In the normal position of use, the wall 86 is disposed horizontally, with the wall 87 extending vertically upward from the corner 88 defined by the meeting edges of said walls. The wall 86 is preferably of rectangular shape, as shown. The wall 87 is shown as generally triangular, with its lateral edges inclined inward and upward from the ends of the wall 86. It is provided with an opening 89 formed to receive and engage a flexible resilient tubing and to constrain the tubing against rotation, and with a restricted slot 91 through which the tubing may be passed to insert it in and remove it from the opening 89. The opening 89 is located centrally of the wall 87 somewhat below the upper edge thereof, and the slot 91 extends from said opening to said upper edge. The opening 89 and slot 91 are shown as similar in shape to the opening 21 and slot 23 described above, for use in holding the above described perforated tubing 4 as shown in Fig. 23, with the ridge 14 of such tubing in engagement with any one of the angularly spaced notches or recesses 92 located circumferentially of said opening in the same manner as described above in connection with the notches 24. It will be understood, however, that the holder 85 may be provided with openings of other forms adapted to receive and engage other forms of perforated tubing, as described above with reference to Figs. 14–20.

Fig. 23 shows the holder 85 with its horizontal wall 86 resting upon a horizontally extending solid support 93 such as hard ground or a brick or concrete wall, or a wood support member. The extended surface area of wall 86 provides a sufficient bearing against the support 93 to prevent the holder from tilting and thereby hold the tubing in a desired orientation. The wall 86 is preferably provided with one or more preformed small holes for receiving nails, screws, wire or other fastening means, and I have shown a plurality of such small holes 94 at suitable positions in each of the walls 86 and 87 for this purpose. When the support 93 in Fig. 23 is a wood support member, the holder 85 may be secured thereto by small nails driven through the holes 94 in wall 86. It will be apparent that, in suitable cases, the vertical wall 87 may be secured in bearing engagement with a vertical surface of a wood support by means of nails driven through the holes 94 in said wall, in a manner similar to that illustrated in Fig. 11.

Any of the forms of tubing described above may be formed by conventional methods of forming plastic or rubber tubing, as by extrusion of a suitable plastic or rubber composition through a suitably shaped die. Any of the above described forms of tubing holder may be formed from a single piece of thin sheet metal by suitable cutting, bending and forming operations, or may be formed of other material of suitable strength and rigidity, such as molded plastic.

Watering systems such as described above are inexpensive to manufacture and install. They may be quickly and easily installed in any desired locations either indoors or outdoors, with the delivery lines 1 either close to the ground or floor or at any desired elevation by attaching the spaced tubing holders to suitable supports. The water is delivered in the form of fine sprays, so as to be uniformly distributed over an area adjacent the tubing along the entire length thereof.

The tubing holders maintain the tubing in the desired position and also control the orientation of the perforations and hence the orientation of the water sprays, so that the water may be delivered over a desired area at both sides of the tubing, or principally or wholly at one side of the tubing.

Due to the small size of the perforations and the relatively large spacing therebetween the rate of delivery of water is low and, when used for irrigation, may be made to correspond closely to the water requirement or absorption rate of growing plants. By using very small perforations and spacing them relatively far apart, preferably at intervals of a foot or more, the rate of water delivery to the adjacent area may be maintained below the rate of penetration of water into the soil so as to avoid waste of water due to run-off. The small rate of delivery per unit length of tubing, due to the very small perforations and the relatively large spacing therebetween, also makes it possible to deliver water uniformly along the length of a tubing of relatively great length.

Such a system may be used for irrigating large areas, or for humidifying hot houses or other enclosures used for growing orchids or other plants requiring high humidity. It may also be used, during hot weather, for cooling and humidifying patios or other sheltered areas to provide greater comfort. The fine spray produced by this watering system is also very beneficial in preventing wilting or undue evaporation losses of plants even under hot dry prevailing conditions.

I claim:

1. In a watering system, the combination comprising: an elongated tubular conduit having a wall formed of flexible resilient material provided with a plurality of longitudinally spaced very small perforations and with at least one external radial asymmetry extending longitudinally of the conduit; and a plurality of holders each having a wall provided with an opening to receive and support the conduit at a position between adjacent perforations; said wall of each holder being formed to provide at least one radial asymmetry adjacent the opening therein for engagement with the radial asymmetry of the conduit wall to constrain the conduit against angular movement about its axis, and each holder having a portion of extended surface area for bearing engagement with a fixed support.

2. In a watering system, the combination comprising: an elongated tubular conduit having a wall formed of flexible resilient material provided with a plurality of longitudinally spaced very small perforations and with at least one external radial asymmetry extending longitudinally of the conduit; and a plurality of holders each having a wall provided with an opening of generally circular shape formed to receive and support the conduit at a position between adjacent perforations; said wall of each holder being formed to provide a plurality of radial asymmetries at different angular positions about said opening for selective engagement with the radial asymmetry of the conduit wall in such manner as to constrain the conduit against angular movement about its axis and control the orientation of the perforations; and said conduit wall being deformable inward to release said radial asymmetry thereof from engagement with a radial asymmetry of said wall of any holder, whereby said conduit may be adjusted angularly about its axis relative to each holder to bring the radial asymmetry of said conduit wall into engagement with any one of the radial asymmetries of the holder wall.

3. In a watering system, the combination comprising: an elongated tubular conduit having a wall formed of flexible resilient material provided with a plurality of longitudinally spaced very small perforations and with at least one outwardly projecting ridge extending longitudinally of the conduit; and a plurality of holders each having a wall provided with an opening of generally circular shape formed to receive and support the conduit at a position between adjacent perforations; said wall of each holder being formed to provide a plurality of notches at different angular positions about said opening for selective engagement with the ridge of the conduit wall in such manner as to constrain the conduit against angular movement about its axis and control the orientation of the perforations; and said conduit wall being deformable inward to release said ridge from engagement with a notch of said wall of any holder, whereby said conduit may be adjusted angularly about its axis relative to each holder to bring said ridge into engagement with any one of the notches of the holder wall.

4. In a watering system, the combination comprising: an elongated tubular delivery member formed of flexible resilient material provided with a plurality of longitudinally spaced very small perforations; and a holding member having a wall provided with an opening of generally circular shape formed to receive and support said delivery member at a position between adjacent perforations; one of said members being formed to provide a plurality of radial asymmetries disposed at different angular positions about the axis of the delivery member when said delivery member is received in said opening; and the other of said members being formed to provide at least one radial asymmetry for engagement with any one of the radial asymmetries of said one member to constrain the delivery member against rotation about its axis; said delivery member being deformable inward to release the radial asymmetries of said members from engagement with each other, whereby said delivery member may be adjusted angularly about its axis relative to the holding member to bring the radial asymmetry of said other member into engagement with any one of the radial asymmetries of said one member.

5. A holder for supporting and positioning flexible tubing comprising: a wall having an opening of generally circular shape therethrough located adjacent but spaced from an edge of said wall, and a slot of less width than the diameter of said opening extending from said opening to said edge; said slot being of sufficient width to permit the tubing to pass therethrough when compressed laterally, whereby the tubing may be inserted into and removed from the opening through said slot; said wall being formed to provide at least one radial asymmetry at the periphery of said opening spaced from said slot, to engage an asymmetry on said tubing; and said holder having a portion defining an extended bearing surface for engagement with a fixed support.

6. A holder as set forth in claim 5, in which said wall is provided with a plurality of radial asymmetries at the periphery of said opening at different angular positions relative to said slot, for selective engagement with the radial asymmetry of the tubing.

7. A holder for supporting and positioning flexible tubing comprising: a unitary member of small thickness having one wall of extended surface area adapted to engage a fixed support; and another wall integrally connected to said one wall and extending at a wide angle with respect thereto; said other wall having an opening of generally circular shape therethrough located adjacent but spaced from an edge thereof and formed to receive and engage said tubing, and a slot of less width than the diameter of said opening extending from said opening to said edge; said slot being of sufficient width to permit the tubing to pass therethrough when compressed laterally, whereby the tubing may be inserted into and removed from the opening through said slot; and said other wall being formed to provide at least one radial asymmetry at the periphery of said opening, to engage an asymmetry on said tubing.

References Cited in the file of this patent

UNITED STATES PATENTS

| | | |
|---|---|---|
| 803,185 | McKinley | Oct. 31, 1905 |
| 1,659,470 | Owen | Feb. 14, 1928 |
| 1,686,115 | Anderson | Oct. 2, 1928 |
| 2,041,174 | Flack | May 19, 1936 |
| 2,108,759 | Turman | Feb. 15, 1938 |
| 2,196,456 | Charroin | Apr. 9, 1940 |
| 2,291,430 | Ingersoll | July 28, 1942 |
| 2,314,525 | Summers | Mar. 23, 1943 |
| 2,430,809 | Flora | Nov. 11, 1947 |
| 2,621,075 | Sedar | Dec. 9, 1952 |
| 2,644,718 | Richard | July 7, 1953 |
| 2,722,237 | Rosel | Nov. 1, 1955 |

FOREIGN PATENTS

| | | |
|---|---|---|
| 127,349 | Australia | Mar. 4, 1948 |
| 285,398 | Switzerland | Dec. 16, 1952 |